United States Patent [19]
Grehant

[11] Patent Number: 5,237,169
[45] Date of Patent: Aug. 17, 1993

[54] INSTALLATION FOR CONTROLLING THE LIGHTING LEVEL OF PREMISES

[75] Inventor: Bernard J. Grehant, Barberaz, France

[73] Assignee: Somfy, France

[21] Appl. No.: 907,235

[22] Filed: Jul. 1, 1992

[30] Foreign Application Priority Data

Jul. 3, 1991 [FR] France .................... 91 08331

[51] Int. Cl.⁵ ............................................ H01J 40/14
[52] U.S. Cl. ............................ 250/214 AL; 315/151
[58] Field of Search ............ 250/205, 214 AL, 214 D; 315/151, 159

[56] References Cited

U.S. PATENT DOCUMENTS 4,751,433 6/1988 Baccanelli .................... 250/214 AL
4,804,858 2/1989 Jörlöv et al. ................. 250/214 AL

*Primary Examiner*—David C. Nelms
*Assistant Examiner*—K. Shami
*Attorney, Agent, or Firm*—Laff, Whitesel, Cote & Saret

[57] ABSTRACT

Device for automatically controlling the lighting level of premises (A) having available one or more openings (B) to the outside. This device acts on means (V, S, E) of masking the openings and on means of artificial lighting with dimmer (L) as a function of a set point value corresponding to a lighting level established by the user and recorded instantaneously. The masking and lighting means are furthermore controlled in a specified order so as to limit the consumption of energy. In certain implementations, this order is determined as a function of the deviation between a measured temperature and a threshold temperature.

38 Claims, 20 Drawing Sheets

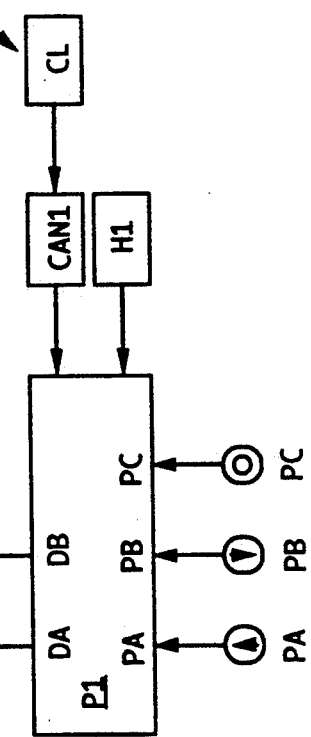
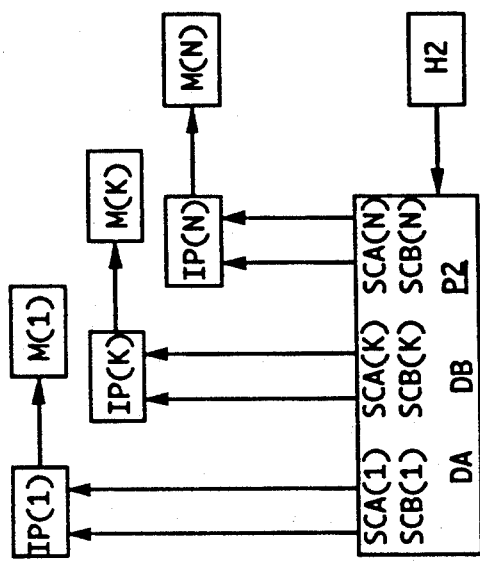
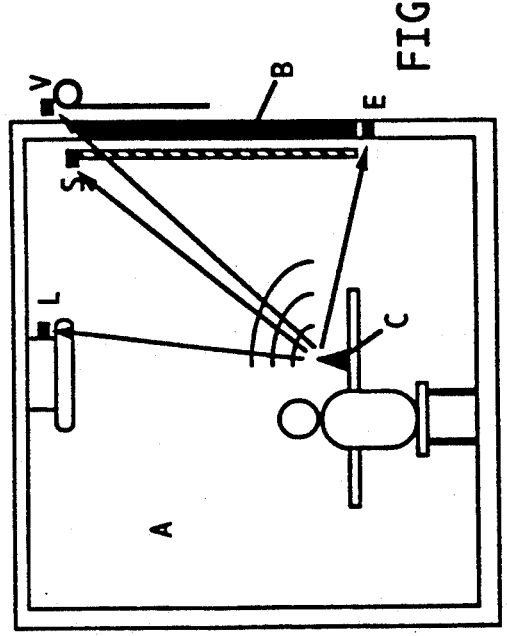
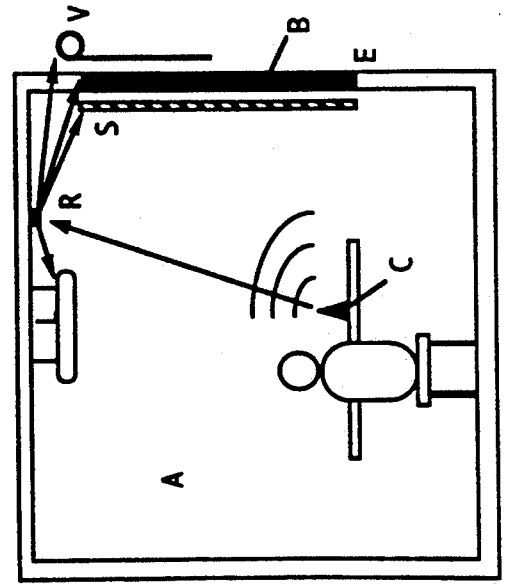

FIG. 10          FIG. 10 A
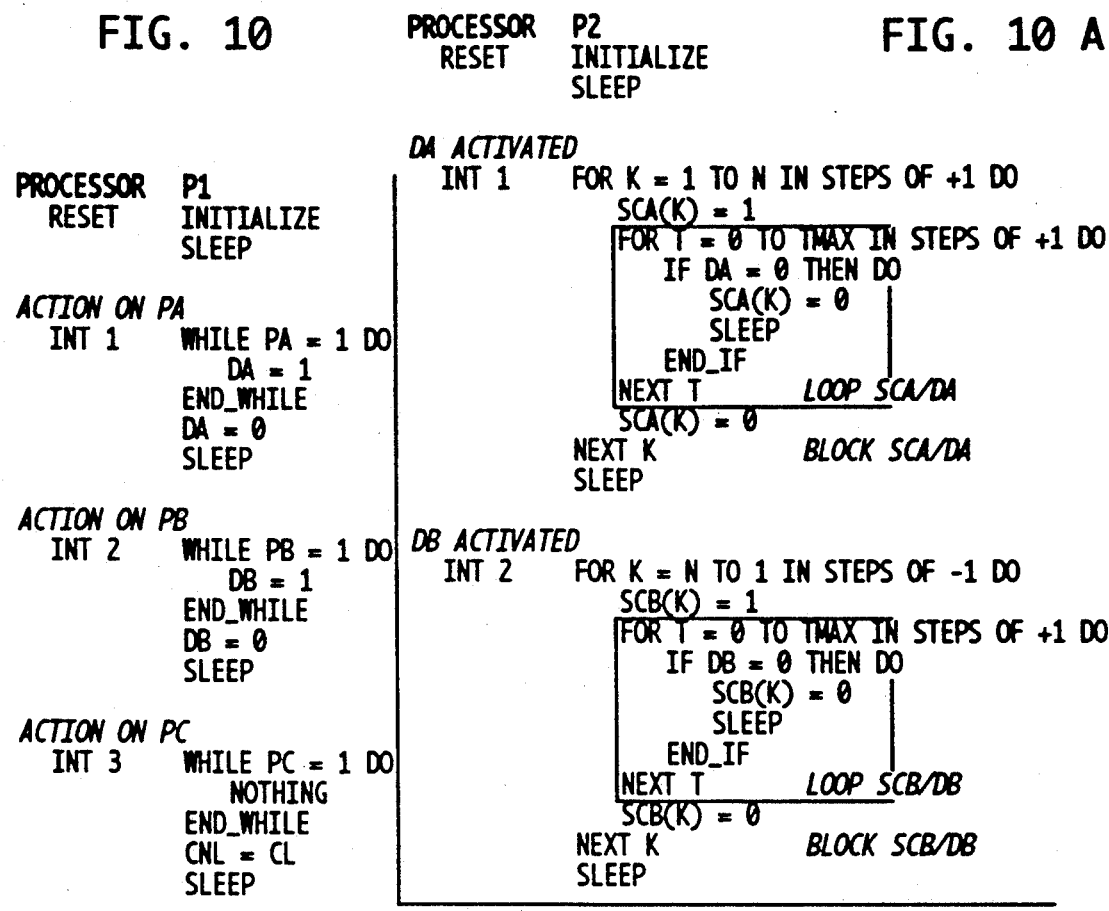
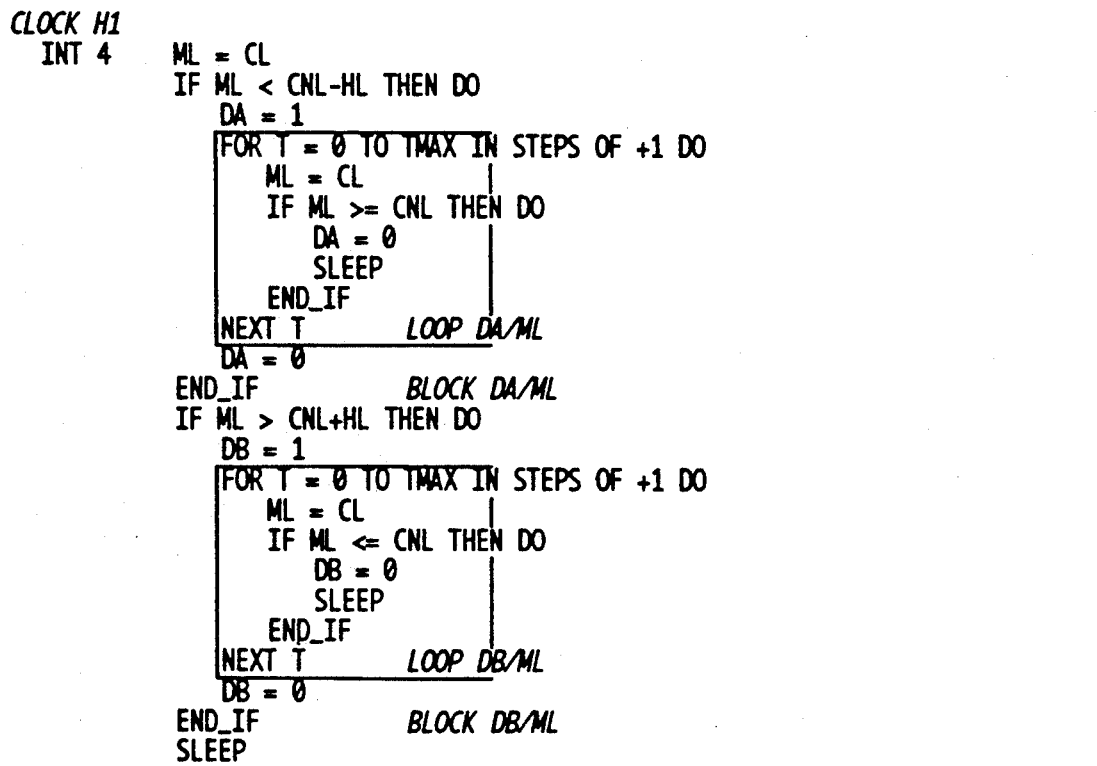

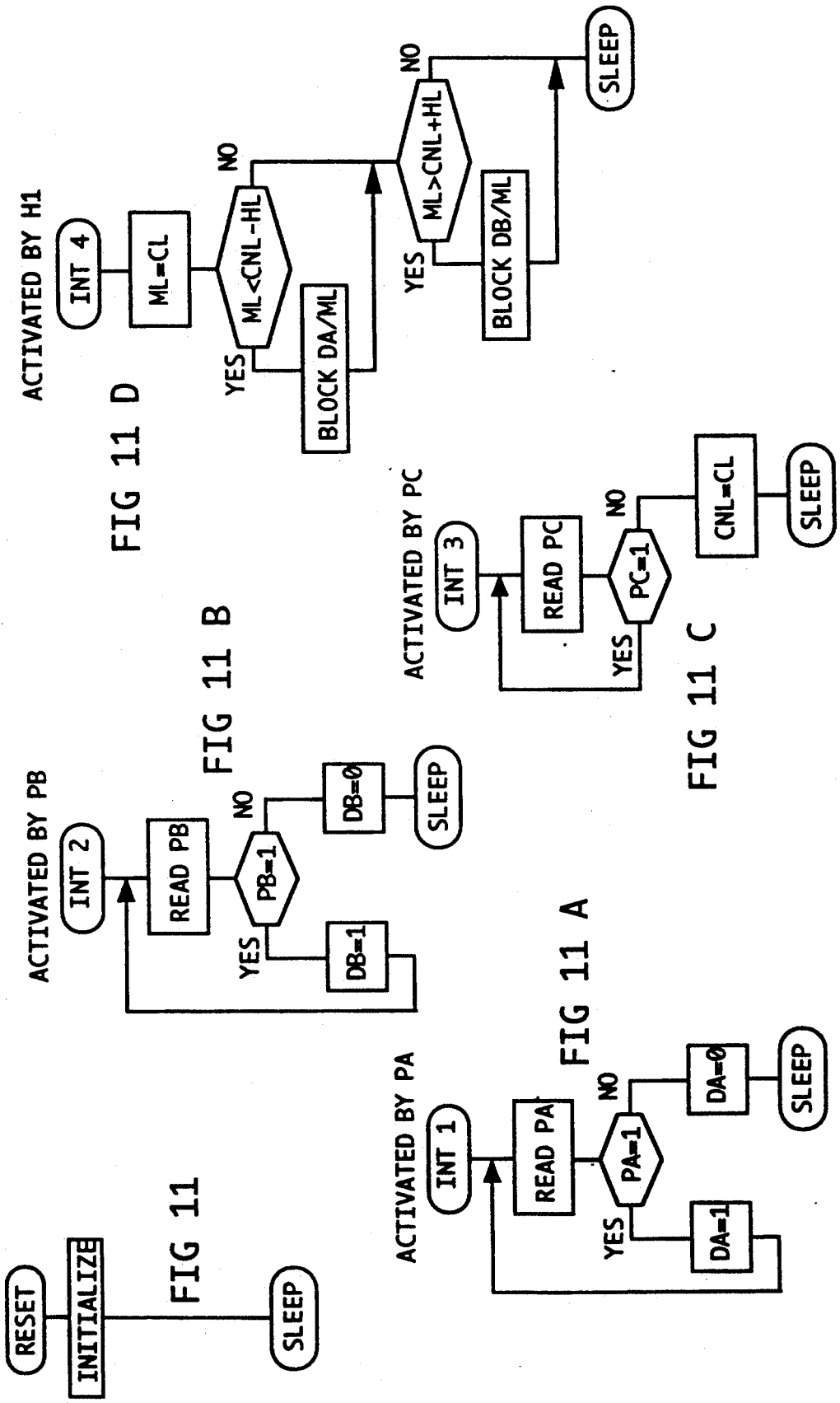

PROCESSEUR 2
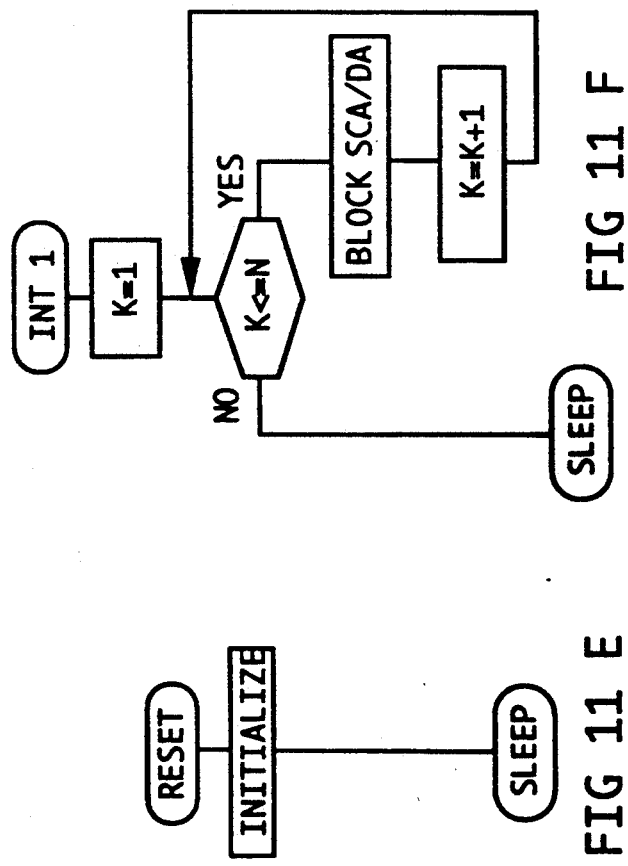
FIG 11 G
FIG 11 F
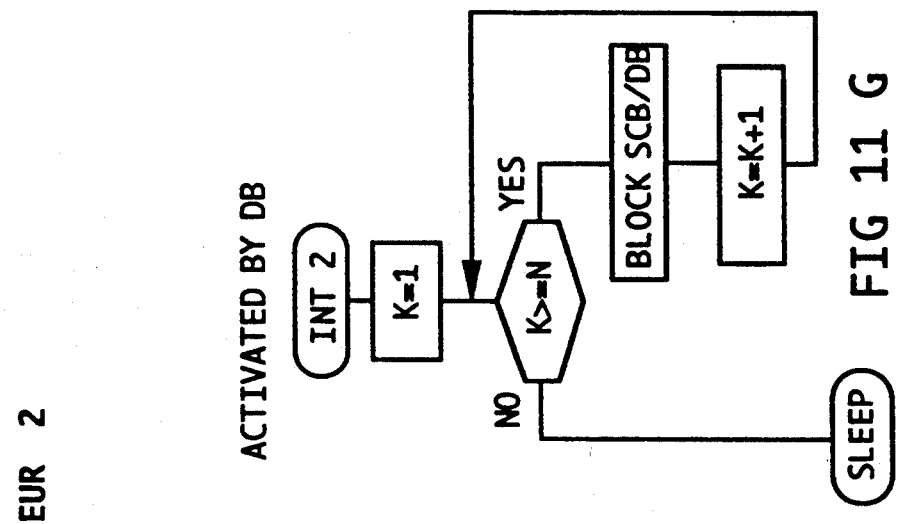
FIG 11 E

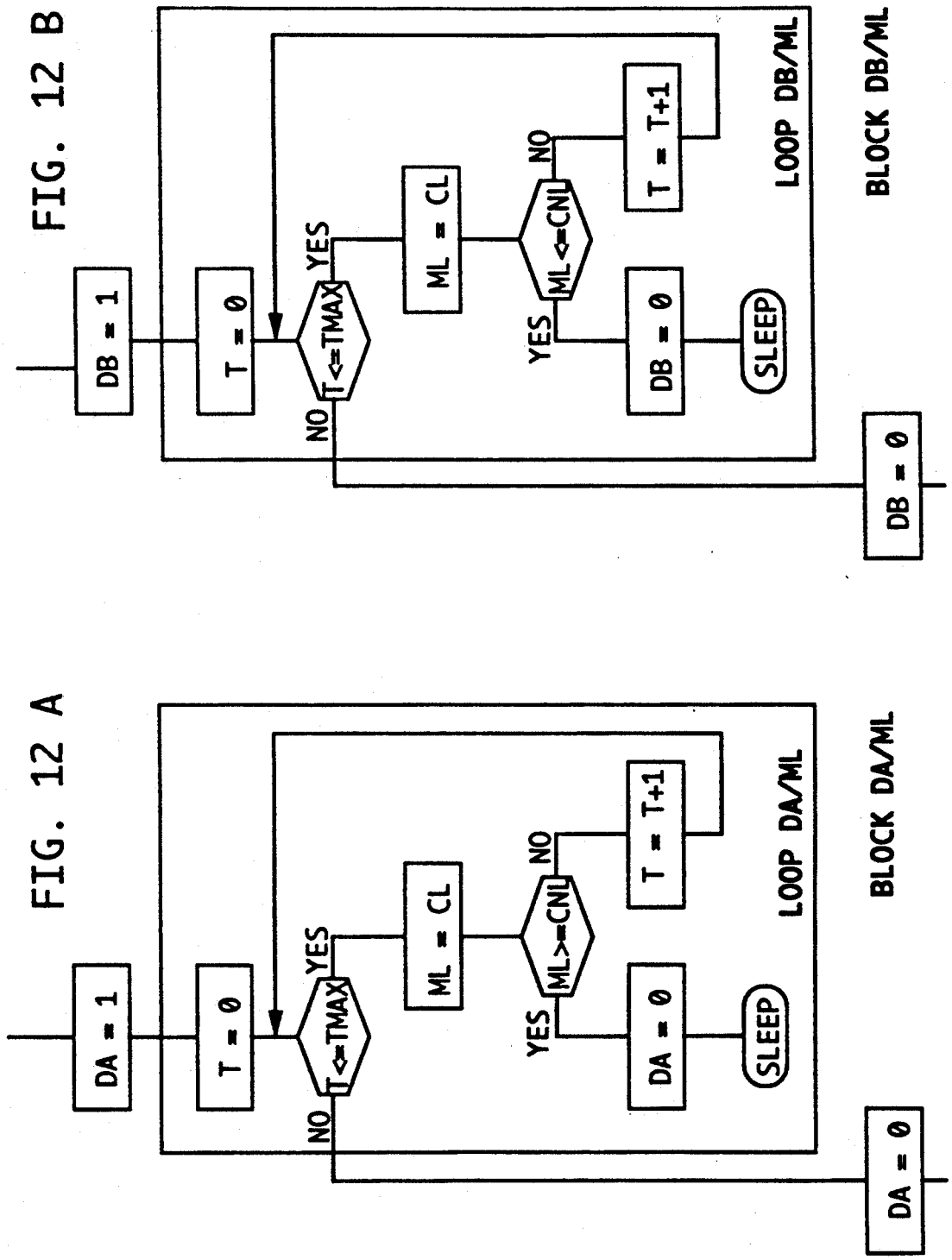

FIG. 13

```
PROCESSOR  P
RESET       INITIALIZE
            SLEEP

PA ACTIVATED
  INT 1    FOR K = 1 TO N IN STEPS OF +1 DO
             SCA(K) = 1
             FOR T = 0 TO TMAX IN STEPS OF +1 DO      LOOP SCA/PA
               IF PA = 0 THEN DO
                 SCA(K) = 0
                 SLEEP
               END_IF
             NEXT T
             SCA(K) = 0                                BLOCK SCA/PA
           NEXT K
           SLEEP

PB ACTIVATED
  INT 2    FOR K = N TO 1 IN STEPS OF -1 DO
             SCB(K) = 1
             FOR T = 0 TO TMAX IN STEPS OF +1 DO      LOOP SCB/PB
               IF PB = 0 THEN DO
                 SCB(K) = 0
                 SLEEP
               END-IF
             NEXT K
             SCB(K) = 0                                BLOCK SCB/PB
           NEXT K
           SLEEP

ACTION ON PC
  INT 3    WHILE PC = 1 DO
             NOTHING
           END_WHILE
           CNL = CL
           SLEEP

CLOCK H
  INT 4    ML = CL
           IF ML < CNL-HL THEN DO
             INCREASE
           END_IF
           IF ML > CNL + HL THEN DO
             DECREASE
           END_IF
           SLEEP

INCREASE   FOR K = 1 TO N IN STEPS OF +1 DO
             SCA(K) = 1
             FOR T = 0 TO TMAX IN STEPS OF +1 DO      LOOP SCA/ML
               ML = CL
               IF ML >= CNL THEN DO
                 SCA(K) = 0
                 SLEEP
               END_IF
             NEXT T
             SCA(K) = 0                                BLOCK SCA/ML
           NEXT K
           RETURN

DECREASE   FOR K = N TO 1 IN STEPS OF -1 DO
             SCB(K) = 1
             FOR T = 0 TO TMAX IN STEPS OF +1 DO      LOOP SCB/ML
               ML = CL
               IF ML <= CNL THEN DO
                 SCB(K) = 0
                 SLEEP
               END_IF
             NEXT T
             SCB(K) = 0                                BLOCK SCB/ML
           NEXT K
           RETURN
```

FIG. 14

```
PROCESSOR P
    RESET               DITTO FIG.13

ACTION ON PK
    INT 0    K = K+1
             IF K > N THEN K = K-N
             TURN ON (K)
             WHILE PK = 1 DO
                 NOTHING
             END_WHILE
             TURN OFF (K)
             SLEEP

ACTION ON PA
    INT 1    TURN ON (K)
             WHILE PA = 1 DO
                 SCA(K) = 1
             END_WHILE
             SCA(K) = 0
             TURN OFF (K)
             SLEEP

ACTION ON PB
    INT 2    TURN ON (K)
             WHILE PK = 1 DO
                 SCB(K) = 1
             END_WHILE
             SCB(K) = 0
             TURN OFF (K)
             SLEEP

ACTION ON PC
    INT 3               DITTO FIG.13

CLOCK H
    INT 4               DITTO FIG.13

INCREASE            DITTO FIG.13

DECREASE            DITTO FIG.13
```

FIG. 15

```
PROCESSOR  P
   RESET                DITTO FIG.13

ACTION ON PK
   INT 0    K = K+1
            IF K > N THEN K = K-N
            TURN ON (K)
            WHILE PK = 1 DO
                NOTHING
            END_WHILE
            TURN OFF (K)
            KMEM = K
            SLEEP

ACTION ON PA
   INT 1    TURN ON (K)
            WHILE PA = 1 DO
                SCA(K) = 1
            END_WHILE
            SCA(K) = 0
            TURN OFF (K)
            SLEEP

ACTION ON PB
   INT 2    TURN ON (K)
            WHILE PB = 1 DO
                SCB(K) = 1
            END_WHILE
            SCB(K) = 0
            TURN OFF (K)
            SLEEP

ACTION ON PC
   INT 3                DITTO FIG.13

CLOCK H
   INT 4                DITTO FIG.13

INCREASE  FOR K = 1 TO N IN STEPS OF +1 DO
                IF K <> KMEM THEN DO
                    BLOCK SCA/ML
                END_IF
             NEXT K
             RETURN

DECREASE  FOR K = N TO 1 IN STEPS OF -1 DO
                IF K <> KMEM THEN DO
                    BLOCK SCB/ML
                END_IF
             NEXT K
             RETURN
```

PROCESSOR P
  RESET  DITTO FIG. 13

FIG. 16

ACTION ON PK
  INT 0    K = K+1
           IF K > N THEN K = K-N
           TURN ON (K)
           WHILE PK = 1 DO
               NOTHING
           END_WHILE
           TURN OFF (K)
           KMEM = K
           SLEEP

ACTION ON PA
  INT 1    TURN ON (K)
           WHILE PA = 1 DO
               SCA(K) = 1
           END_WHILE
           SCA(K) = 0
           TURN OFF (K)
           SLEEP

ACTION ON PB
  INT 2    TURN ON (K)
           WHILE PB = 1 DO
               SCB(K) = 1
           END_WHILE
           SCB(K) = 0
           TURN OFF (K)
           SLEEP

ACTION ON PC
  INT 3    DITTO FIG. 13

CLOCK H
  INT 4    DITTO FIG. 10

INCREASE  K = KMEM
                [BLOCK SCA/ML]
                FOR K = 1 TO N IN STEPS OF +1 DO
                    IF K <> KMEM THEN DO
                        [BLOCK SCA/ML]
                    END_IF
                NEXT K
                RETURN

DECREASE  K = KMEM
                [BLOCK SCB/ML]
                FOR K = N TO 1 IN STEPS OF -1 DO
                    IF K <> KMEM THEN DO
                        [BLOCK SCB/ML]
                    END_IF
                NEXT K
                RETURN

FIG. 17

```
PROCESSOR  P
  RESET                    DITTO FIG. 13

PA ACTIVATED
  INT 1                    DITTO FIG. 13

PB ACTIVATED
  INT 2                    DITTO FIG. 13

ACTION ON PC
  INT 3                    DITTO FIG. 13

CLOCK H
  INT 4      ML = CL
             IF ML < CNL-HL THEN DO
                 INCREASE
             END_IF
             IF ML > CNL + HL THEN DO
                 DECREASE
             END_IF
             SLEEP

INCREASE   FOR K = 1 TO N IN STEPS OF +1 DO
                 MK = 1
                 WHILE MK = 1 DO
                     MLP = CL
                     SCA(K) = 1
                     LOOP SCA/ML        WITH TH
                     IF ML < MLP + HL THEN DO
                         SCA(K) = 0
                         MK = 0
                     END_IF
                 END_WHILE
             NEXT K
             RETURN

DECREASE   FOR K = N TO 1 IN STEPS OF -1 DO
                 MK = 1
                 WHILE MK = 1 DO
                     MLP = CL
                     SCB(K) = 1
                     LOOP SCB/ML        WITH TH
                     IF ML > MLP - HL THEN DO
                         SCB(K) = 0
                         MK = 0
                     END_IF
                 END_WHILE
             NEXT K
             RETURN
```

FIG. 18

```
PROCESSOR P2 (OR P)
    RESET   INITIALIZE
            FOR K = 1 TO N IN STEPS OF +1 DO
                FCA(K) = 0
                FCB(K) = 0
            NEXT K
            SLEEP

DA (OR PA) ACTIVATED
    INT 1   DITTO FIG.10 (OR FIG. 13)

DB (OR PB) ACTIVATED
    INT 2   DITTO FIG.10 (OR FIG. 13)

PC ACTIVATED
    INT 3   DITTO FIG.10 (OR FIG. 13)

(CLOCK H)
    (INT 4)  (DITTO FIG. 13)

INCREASE FOR K = 1 TO N IN STEPS OF +1 DO
                WHILE FCA(K) = 0 DO
                    MLP = CL
                    SCA(K) = 1
                    FCB(K) = 0
                    LOOP SCA/ML       WITH TH
                    IF ML < MLP + HL THEN DO
                        SCA(K) = 0
                        FCA(K) = 1
                    END_IF
                END_WHILE
            NEXT K
            RETURN

DECREASE FOR K = N TO 1 IN STEPS OF -1 DO
                WHILE FCB(K) = 0 DO
                    MLP = CL
                    SCB(K) = 1
                    FCA(K) = 0
                    LOOP SCB/ML       WITH TH
                    IF ML > MLP - HL THEN DO
                        SCB(K) = 0
                        FCB(K) = 1
                    END_IF
                END_WHILE
            NEXT K
            RETURN
```

FIG. 19

PROCESSOR P2 (OR P)

RESET    DITTO FIG.10 (OR FIG. 13)

DA (OR PA) ACTIVATED
   INT 1    DITTO FIG.10 (OR FIG. 13)

DB (OR PB) ACTIVATED
   INT 2    DITTO FIG.10 (OR FIG. 13)

PC ACTIVATED
   INT 3    DITTO FIG. 10 (OR FIG. 13)

(CLOCK H)
   (INT 4)  (DITTO FIG. 13)

```
INCREASE FOR K = 1 TO N IN STEPS OF +1 DO
            READ FCA(K)
            WHILE FCA(K) = 0 DO
                SCA(K) = 1
                ML = CL
                IF ML >= CNL THEN DO
                    SCA(K) = 0
                    SLEEP
                END_IF
                READ FCA(K)
            END_WHILE
            SCA(K) = 0
         NEXT K
         RETURN

DECREASE FOR K = N TO 1 IN STEPS OF -1 DO
            READ FCB(K)
            WHILE FCB(K) = 0 DO
                SCB(K) = 1
                ML = CL
                IF ML <= CNL THEN DO
                    SCB(K) = 0
                    SLEEP
                END_IF
                READ FCB(K)
            END_WHILE
            SCB(K) = 0
            END_WHILE
         NEXT K
         RETURN
```

FIG. 20

```
PROCESSOR P2 (OR P)
   RESET    INITIALIZE
            FOR K = 1 TO N IN STEPS OF +1 DO
               FCA(K) = 0
               FCB(K) = 0
            NEXT K
            SLEEP

DA (OR PA) ACTIVATED
   INT 1    DITTO FIG.10 (OR FIG. 13)

DB (OR PB) ACTIVATED
   INT 2    DITTO FIG.10 (OR FIG. 13)

PC ACTIVATED
   INT 3    DITTO FIG.10 (OR FIG. 13)

(CLOCK H)
   (INT 4)  (DITTO FIG. 13)

INCREASE FOR K = 1 TO N IN STEPS OF +1 DO
               WHILE FCA(K) = 0 DO
                  SCA(K) = 1
                  |LOOP SCA/ML    |  (TH)
                  IF ACK = 0 THEN DO
                     SCA(K) = 0
                     FCA(K) = 1
                  ELSE DO FCB(K) = 0
                     ERASE
                  END_WHILE
            NEXT K
            RETURN

DECREASE FOR K = N TO 1 IN STEPS OF -1 DO
               WHILE FCB(K) = 0 DO
                  SCB(K) = 1
                  |LOOP SCB/ML    |  (TH)
                  IF ACK = 0 THEN DO
                     SCB(K) = 0
                     FCB(K) = 1
                  ELSE DO FCA(K) = 0
                     ERASE
                  END_WHILE
            NEXT K
            RETURN

ERASE    CLR = 1
            CLR = 0
            RETURN
```

PROCESSOR P1 DITTO FIG. 10

FIG. 21

PROCESSOR P2
   RESET    INITIALIZE
               SLEEP

*DA ACTIVATED*
   INT 1    DITTO FIG.10

*DB ACTIVATED*
   INT 2    DITTO FIG.10

*CLOCK H2*
```
   INT 4    DISABLE INT 1
            DISABLE INT 2
            IF ALPHA = 0 THEN DO
                IF TINT < TSEUIL - HT THEN DO
                    ALPHA = 1
                    WHILE FCA(1) = 0 DO
                        SCA(1) = 1
                    END_WHILE
                    SCA(1) = 0
                END_IF
            END_IF
            IF ALPHA = 1 THEN DO
                IF TINT > TSEUIL+HT THEN DO
                    ALPHA = 0
                    WHILE FCA(2) = 0 DO
                        SCA(2) = 1
                    END_WHILE
                    WHILE DB = 1
                    AND FCB(1) = 0 DO
                        SCB(1) = 1
                    END_WHILE
                END-IF
            END_IF
            ENABLE INT 2
            ENABLE INT 1
            SLEEP
```

FIG. 23

*DA ACTIVATED*
   INT 1    IF ALPHA = 1 THEN LIST_A = 1,2,3,
               ELSE LIST_A = 2,1,3
               FOR VARYING IN LIST_A DO
                    [BLOCK SCA/DA]
               NEXT K
               SLEEP

*DB ACTIVATED*
   INT 2    IF ALPHA = 1 THEN LIST_B = 3,2,1,
               ELSE LIST_B = 3,1,2
               FOR K VARYING IN LIST_B DO
                    [BLOCK SCB/DB]
               NEXT K
               SLEEP

FIG. 22

PROCESSOR P
  RESET    INITIALIZE
            SLEEP

PA ACTIVATED
  INT 1    DITTO FIG. 13

PB ACTIVATED
  INT 2    DITTO FIG. 13

CLOCK H2
  INT 4    DISABLE INT 1
           DISABLE INT 2
           IF ALPHA = 0 THEN DO
               IF TINT < TSEUIL - HT THEN DO
                   ALPHA = 1
                   WHILE FCA(1) = 0 DO
                       SCA(1) = 1
                   END_WHILE
                   SCA(1) = 0
               END_IF
           END_IF
           IF ALPHA = 1 THEN DO
               IF TINT > TSEUIL+HT THEN DO
                   ALPHA = 0
                   WHILE FCA(2) = 0 DO
                       SCA(2) = 1
                   END_WHILE
                   WHILE FCB(1) = 0 DO
                       SCB(1) = 1
                       ML = CL
                       IF ML <= CNL THEN DO
                           SCB(1) = 0
                           ENABLE INT 2
                           ENABLE INT 1
                           SLEEP
                       END_IF
                   END_WHILE
               END_IF
           END_IF
           ENABLE INT 2
           ENABLE INT 1
           *THEN DITTO FIG.13 FOR LIGHT MONITORING*
           SLEEP

*DA ACTIVATED*
  INT 1    IF ALPHA = 1 THEN LIST_A = 1,2,3,
           ELSE LIST_A = 2,3,1
           FOR K VARYING IN LIST_A DO
               BLOCK SCA/DA
           NEXT K
           SLEEP

*DB ACTIVATED*
  INT 2    IF ALPHA = 1 THEN LIST_B = 3,2,1,
           ELSE LIST_B = 1,3,2
           FOR K VARYING IN LIST_B DO
               BLOCK SCB/DB
           NEXT K
           SLEEP

FIG. 24

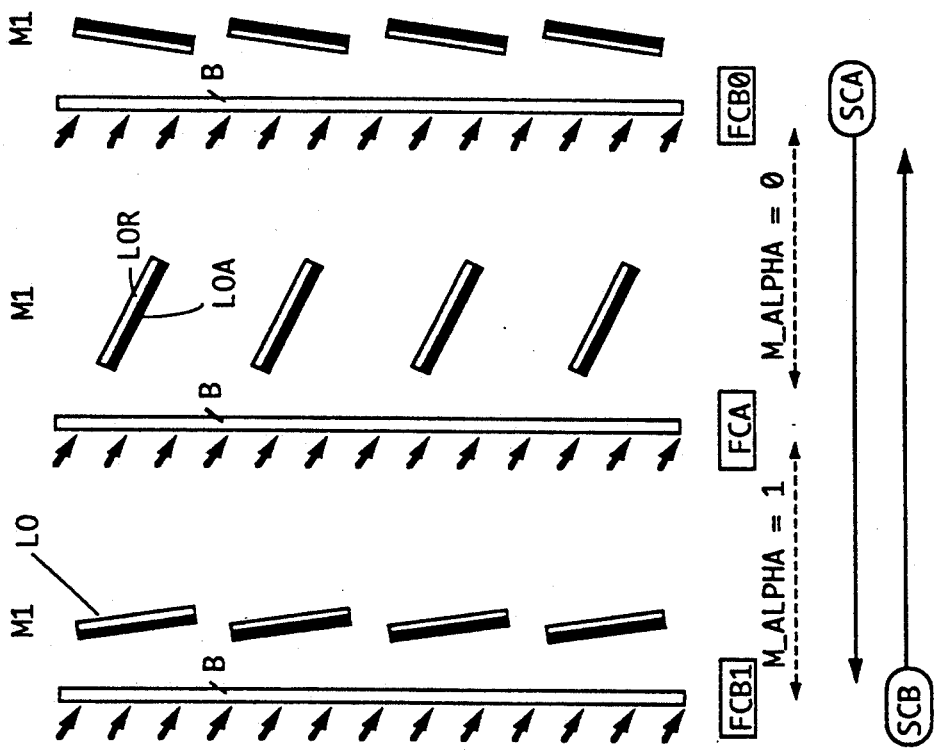

```
PROCESSOR P1 DITTO FIG. 10

PROCESSOR P2  INITIALIZE
       RESET  SLEEP

DA ACTIVATED
    INT 1    DITTO FIG.10

DB ACTIVATED
    INT 2    DITTO FIG.10

CLOCK H2
    INT 4    DISABLE INT 1
             DISABLE INT 2
             ALPHA = ALPHA_0+KP*(TINT-TSEUIL)
             IF ALPHA > 1 THEN DO ALPHA = 1
             IF ALPHA < 0 THEN DO ALPHA = 0
             IF ALPHA > M_ALPHA+HA THEN DO
                 WHILE ALPHA < M_ALPHA DO
                     SCA(1) = 1
                 END_WHILE
                 SCA(1) = 0
             END_IF
             IF ALPHA < M_ALPHA-HA THEN DO
                 WHILE FCA(2) = 0 DO
                     SCA(2) = 1
                 END_WHILE
                 WHILE ALPHA < M_ALPHA
                 AND DB = 1 DO
                     SCB(1) = 1
                 END_WHILE
             END_IF
             ENABLE INT 2
             ENABLE INT 1
             SLEEP
```

FIG. 27

```
CLOCK H
    INT 4     IF TINT < TSEUIL-HT THEN DO
                  ALPHA = 1
                  IF M_ALPHA = 0 THEN DO
                      WHILE FCA(1) = 0 DO
                          SCA(1) = 1
                      END_WHILE
                      SCA(1) = 0
                      M_ALPHA = 1
                  END_IF
              END_IF
              IF TINT > TSEUIL+HT THEN DO
                  ALPHA = 0
                  IF M_ALPHA = 1 THEN DO
                      WHILE FCA(1) = 0 DO
                          SCB(1) = 1
                      END_WHILE
                      SCB(1) = 0
                      M_ALPHA = 0
                  END_IF
              END_IF
              SLEEP

INCREASE  IF M_ALPHA = 1 THEN DO                DECREASE  WHILE FCB(2) = 0 DO
              WHILE FCA(1) = 0 DO                             SCB(2) = 1
                  SCB(1) = 1                                  ML = CL
                  ML = CL                                     IF ML <= CNL THEN DO
                  IF ML >= CNL THEN DO                            SCB(2) = 0
                      SCB(1) = 0                                  SLEEP
                      SLEEP                                   END_IF
                  END_IF                                  END_WHILE
              END_WHILE                               SCB(2) = 0
              SCB(1) = 0                              IF M_ALPHA = 1 THEN DO
          END_IF                                          WHILE FCB1(1) = 0 DO
          IF M_ALPHA = 0 THEN DO                              SCA(1) = 1
              WHILE FCA(1) = 0 DO                             ML = CL
                  SCA(1) = 1                                  IF ML <= CNL THEN DO
                  ML = CL                                         SCA(1) = 0
                  IF ML >= CNL THEN DO                            SLEEP
                      SCA(1) = 0                              END_IF
                      SLEEP                               END_WHILE
                  END_IF                                  SCA(1) = 0
              END_WHILE                               END_IF
              SCA(1) = 0                              IF M_ALPHA = 0 THEN DO
          END_IF                                          WHILE FCB0(1) = 0 DO
          WHILE FCA(2) = 0 DO                                 SCB(1) = 1
              SCA(2) = 1                                      ML = CL
              ML = CL                                         IF ML <= CNL THEN DO
              IF ML >= CNL THEN DO                                SCB(1) = 0
                  SCA(2) = 0                                      SLEEP
                  SLEEP                                       END_IF
              END_IF                                      END_WHILE
          END_WHILE                                       SCB(1) = 0
          SCA(2) = 0                                  END_IF
          SLEEP                                       SLEEP
```

INSTALLATION FOR CONTROLLING THE LIGHTING LEVEL OF PREMISES

FIELD OF THE INVENTION

The present invention relates to an installation for controlling the lighting level of premises provided with at least one opening permitting entry of natural light and fitted with means of masking the said opening and with means of artificial lighting, means associated with control operators, this installation comprising photosensitive means for measuring the lighting level, means of automatic control of the operators monitored by the photosensitive means as a function of a lighting set point, means of adjusting this set point consisting of manually actuatable contacts and means of storing this set point, and in which the means of automatic control comprise a logic processing unit electrically connected, by galvanic link or otherwise, to the photosensitive means, to the manually actuatable contacts and to the operators, the logic processing unit being programmed to read the state of the contacts and the values measured by the photosensitive means and to emit signals for more or less lighting directed towards the operators, on the one hand as a function of the state of the said contacts and on the other hand as a function of the deviation between the set point value and the value measured by the photosensitive means, and to record, at an instant determined by the user, a lighting value measured by the photosensitive means.

PRIOR ART

Such an installation forms the subject of patent application FR No. 91 06 160 of the applicant. This installation makes it possible to control several different means placed in parallel with the aid of a single control transmitted simultaneously to all the means. The targeted action is essentially satisfied by the fastest means. The slowest means, although called upon with each manoeuvre, makes only an insignificant contribution. Now, for the demands of comfort, as much as for economy of energy, it would be judicious to have a hierarchized action on the various means intended for the control and/or monitoring of the lighting level. By way of example, it can be assumed that, for premises equipped with a rolling shutter, an interior venetian blind and lighting dimmer, a local energy/comfort analysis may give the following conclusions: the lighting should only be used as a last resort owing to the consumption of electricity; the rolling shutter has its position fixed a priori from thermal considerations and it should be moved only if the light requirement cannot be altered by means of the interior blind; the actuating of the blind modifies the energy balance little or not at all.

In U.S. Pat. No. 4,622,470, describing the control of a sunshade with orientable blades, there is provision for some hierarchization. It nevertheless relates only to the types of sensor, the hierarchy being as follows: night, interior, sun.

SUMMARY OF THE INVENTION

The aim of the present invention is to effect a hierarchized control of various masking and lighting means in an installation such as defined above, taking account of the reaction times of the various means and making it possible to effect an economy of energy.

The installation according to the invention is such that it comprises means of effecting successive control, in a predefined order, of the masking means and of the lighting means, these control means being arranged in such a way that they pass from one means to the next means after a specified duration.

The order in which the various means are controlled can be fixed definitively or be modifiable at will or automatically by taking account, for example, of a thermal factor.

The specified duration can be identical for each means and correspond to the duration required for the slowest means to pass from a completely open state to a completely closed state or vice-versa, or specific to each means or corresponding to the time required for the slowest means to bring about a significant variation in the lighting, the latter duration possibly being chosen specific to each means.

In certain implementations of the invention the time of control of the various means is thus optimized.

In certain implementations the means to be controlled is selected automatically, even upon manual request to modify a lighting level.

BRIEF DESCRIPTION OF THE DRAWINGS

The attached drawing represents, by way of example, several implementations of the installation according to the invention.

FIG. 1 diagrammatically represents premises fitted with various masking and lighting means.

FIG. 2 is a figure similar to FIG. 1 but with a control variant.

FIG. 3 represents the block diagram of a first implementation of the installation according to the invention.

FIGS. 10 and 10A represent, in design language, the software module of the first implementation.

FIGS. 11 and 11a–11g show the software module in flow diagram form of the first implementation.

FIG. 13 represents the software module, in design language, of the second implementation.

FIG. 14 represents the software module, in design language of the third implementation.

FIG. 15 represents the module and software, in design language, of the pay variant of the third implementation.

FIG. 16 represents the software module, in design language, of a second variant of the third implementation.

FIG. 17 represents the software module, in design language, of a third variant of the third implementation.

FIG. 18 represents the software module, in design language, of the first or second implementation.

FIG. 19 represents the software module, in design language, of the fourth implementation.

FIG. 20 represents the software module, in design language, of the fifth implementation.

FIG. 21 represents the software module, in design language, of the sixth implementation.

FIG. 22 represents the software module, in design language, of the seventh implementation.

FIG. 23 represents the software module, in design language, of a variant of the sixth and seventh implementation.

FIG. 24 represents the software module of another variant of the sixth implementation.

FIG. 25 represents the software module, in design language, of a second variant of the sixth implementation.

FIG. 26 represents, diagrammatically, the masking means according to an eighth implementation.

FIG. 27 represents the software module, in design language, of the eighth implementation derived from the sixth and seventh implementations.

DESCRIPTION OF THE PREFERRED EMBODIMENTS

Figure 5:
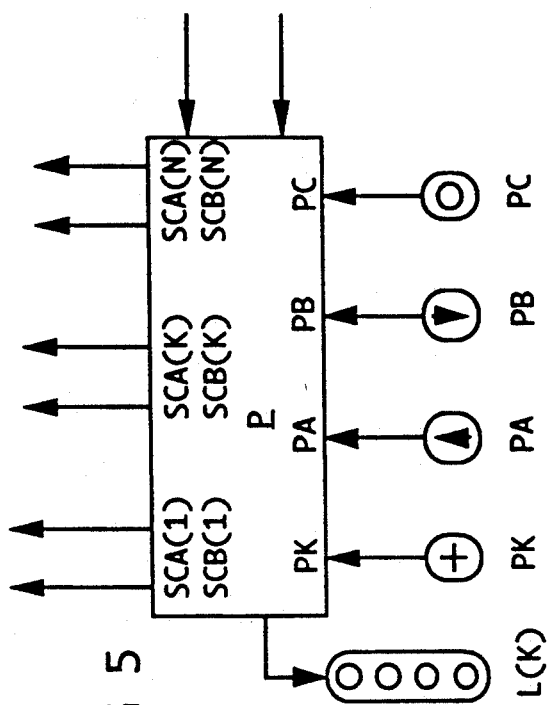
FIG. 5 represents partially the block diagram of a third implementation.

FIG. 1 diagrammatically represents the premises A having an opening closed by a glazed bay B, in this instance fitted with electro-chromic glazing E. The bay B is equipped with a rolling shutter V outside and with a venetian blind S inside. The premises can be lit by means of a light source with dimmer L. The user has available a mobile box C fitted with photosensitive elements for measuring the lighting level. The box furthermore comprises a logic processing unit and control buttons such as described in patent application No. 91 06 160. In the example represented in FIG. 1, the box C furthermore comprises a transmitter directly controlling the light source L, the venetian blind S, the rolling shutter V and the electro-chromic glazing E. The installation is provided with a remote control such as described in French patent application No. 91 06 160.

FIG. 2 represents a variant of FIG. 1 in which the box C does not directly control the masking and lighting means, but controls them by way of a receiver R which in turn retransmits control signals to the various means.

According to a first implementation represented in FIG. 3, the installation corresponds to the diagram of FIG. 2. It comprises a first processor P1 arranged in the box C and having three logic inputs PA, PB, PC activated by manual contacts of the same designation and signifying respectively manual request for more lighting, manual request for less lighting and manual request to record the light level as set point. As described in the preceding application, the contact PC and the corresponding input could be eliminated in favor of automatic recording of the lighting set point. The processor P1 furthermore has a clock input H1. The inputs PA, PB, PC, H1 can activate, in a programmed version, interrupts of respective levels 1, 2, 3, 4, (0=maximum priority), the effect of these interrupts being to make the processor exit from a low-consumption sleep mode, if such a mode is used.

The processor P1 is furthermore connected by an analog-digital convertor CAN1 to the brightness sensor CL mounted in the box C. Two logical outputs DA and DB signify respectively resulting request for more lighting and resulting request for less lighting.

The processor P1 comprises a device for storing a logic routine PRG1 (or logic wiring) such that the processor P1 records the light level set point value CNL as being the value of lighting measured by CL at the instant at which the user actuates the contact PC, and activates the outputs DA and DB directly according to the manual action on PA or PB or at regular intervals, timed by the internal clock H1, depending on whether the lighting measurement made by CL deviates in one direction or the other to more than within a hysteresis threshold HL, from the light level set point CNL recorded in advance, thus defining a light comfort zone of width 2HL centered on CNL, the value HL being fixed by the constructor.

In a programmed version, this action of automatic correction of light level is obtained by activating a program represented by the block DA/ML, found in FIGS. 10 and 11 under INT4, if the measurement of lighting ML, acquired by reading CL, is less than CNL-HL, or a program designated by block DB/ML (FIGS. 10 and 11) if the measurement of the lighting ML is greater than CNL+HL, the duration TMAX used corresponding to the time required to make all the controlled means pass successively from a fully open to fully closed position or vice-versa.

It is useful to point out here that the structure of the block routines X/Y which will be used subsequently is identical to that of blocks DA/ML and DB/ML. Generally, X designates the variable activated for the duration of execution of the program: set to 1 at the start of program and to 0 at the end of program. After setting X to 1, the program executes a sub-block termed the "X/Y loop" of duration TMAX during which it continuously tests a condition on the output variable Y. So as to simplify the notation, the acquisition of the input Y prior to each test has not been made explicit. If this condition is realized, there is an early exit from X/Y after setting the variable X to 0.

The installation further includes a second processor P2 making use of two logic inputs DA and DB linked to the outputs of like designation of the processor P1. The processor P2 is also fitted with a clock H2. In a programmed version, the inputs DA and DB can activate interrupts of respective levels 1, 2, (0=maximum priority) having the effect of making P2 exit from a low-consumption sleep mode if such a mode is used. The processor P2 furthermore makes use, for each controlled means M(K) of (K varying between 1 and N), of two logic outputs SCA(K) and SCB(K), signifying respectively control output for opening the means K and control output for closing the means M(K). The processor P2 furthermore makes use of a device for storing a logic routine PRG2 (or logic wiring) such that the processor P2 activates the outputs controlling the means, successively, and in an order predefined by the constructor, when DA is activated and in the reverse order when DB is activated, passes from onne means M(K) to the next means M(K+1) or M(K−1) after the duration TMAX and ceases to activate the outputs SCA(K) or SCB(K) when DA or DB ceases to be activated.

In a programmed version, these actions are obtained by activating block routines SCA/DA for K varying perhaps from 1 to N during a request for more lighting DA or block routines SCB/DB for K varying perhaps from N to 1 during a request for less lighting DB. The means M(K) are controlled by way of power interfaces IP(K).

The software for this first implementation is represented in design language form in FIGS. 10 and 10A, and as a flow diagram in FIGS. 11A-G and 12A-C.

This dual representation is perfectly clear to the expert and a description would be superfluous.

According to a first variant implementation the duration TMAX provided for in PRG2 is replaced by a duration TMAX(K) specific to each means, this making it possible to reduce time for the whole to be brought into action. In the program, it is sufficient to replace the constant TMAX appearing in the loop X/Y by the variable TMAX(K) and to store a table of N constants assigned to each of the values of TMAX(K).

According to another variant implementation, the wire link between P1 and P2 represented in FIG. 3 is replaced by a wireless link making it possible to arrange PA, PB, PC, P1, CL in the mobile box C (FIG. 2), the processor P2 being arranged in the receiver R.

Figure 4:
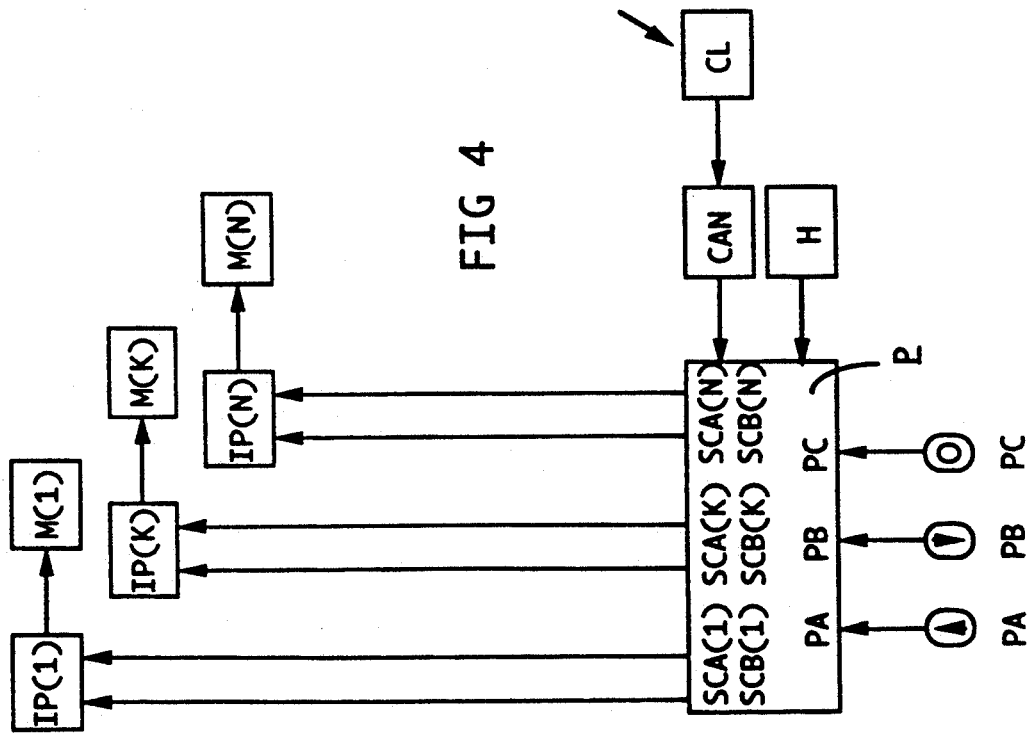
FIG. 4 represents the block diagram of a second implementation.

FIG. 4 illustrates a second implementation in which the processors P1 and P2 are replaced by a single processor P. The lines DA and DB are replaced by the internal coupling of the programs or of the logic wirings of P1 and P2. Processor P has the same inputs as processor P1 and all the outputs which were assigned to processor P2. Processor P records the light level set point value CNL as described previously and activates the outputs SCA(K) or SCB(K), in a predetermined order, ascending from 1 to N for a brightness increase or descending from N to 1 for a brightness decrease, and this directly in accordance with the manual action on PA or PB or at regular intervals timed by the internal clock H, as a function of the measurement of lighting given by CL, as described for the first implementation.

In a programmed version, these actions are obtained by activating the block routine SCA/PA (FIG. 13) for K varying perhaps from 1 to N during a manual request for more lighting PA, or block routines SCB/PB for K varying perhaps from N to 1 during a manual request for less lighting PB, or by activating "Increase" or "Decrease" procedures during automatic correction of the light level, the Increase procedure activating the block SCA/ML for K varying perhaps from 1 to N during automatic detection of an inadequate light level, the Decrease procedure activating block SCB/ML for K varying perhaps from N to 1 during detection of too great a light level. The software is detailed in design language in FIG. 13.

The third implementation, represented partially in FIG. 5, is derived from the previous implementation. The processor P makes use of an extra logic input PK activated by a manual contact of like designation and of N logic outputs L(K) linked to indicator lights of LED or some other type, displaying the means M(K) controlled. Pressing on the button PK makes it possible to pass from control of one means M(K) to the next means M(K+1).

The software for this third implementation is given in FIG. 14 in design language.

According to a first variant of the third implementation, the program (or the logic wiring) of the processor P is unaware, during automatic control of light level correction, of the means M(K) corresponding to the latest manual control applied, the user being presumed to wish permanently to impose the degree of opening of the means which he desires to control. In a programmed version, this action is carried out by storing in KMEM (FIG. 15) the index of the means used during the latest manual control, and modifying the Increase and Decrease procedures described in relation with the second implementation, block SCA/ML or SCB/ML only being activated if K differs from KMEM. According to a second variant of the third implementation, the program (or logic wiring) of the processor P acts by priority, during the automatic control of correction of the light level, on the means M(K) corresponding to the latest manual control applied, the user being presumed to designate, by actuating it, the masking or lighting means which he intends to pick out for the monitoring of the light level.

The software corresponding to this variant is given in FIG. 16. The priority described is embodied by storing in KMEM the index or means M(K) used during the latest manual control, and modifying the Increase and Decrease procedures, the block SCA/ML or SCB/ML being first of all activated in respect of the value KMEM.

According to a variant applicable to all the implementations described previously, the passage from one means (M(K) to the next means, during automatic control of correction of the light level, is performed after a duration TH, termed the reaction time, corresponding to the time required for the slowest means to bring about a significant variation in the lighting, if such a variation is not detected on expiry of TH. The reaction of each means is continuously and successively tested throughout the duration of control of this means.

So as to even further decrease the reaction time of the whole, the passage from one means M(K) to the next means can be done after a duration TH(K) specific to each means, that is to say in the time required for each means to bring about a significant variation in the lighting.

The duration TH replaces TMAX in the previous programs or wirings. This duration is fixed by the constructor. TH is much smaller than TMAX, this enabling the reaction time of the whole to be decreased. FIG. 17 represents the software module in design language, of a corresponding variant of the second implementation. MLP represents the lighting value CL recorded prior to implementing the control.

According to a variant implementation of the first or of the second implementation, the logic states FCA(K) and FCB(K) characterizing, in the active state (1), those means M(K) detected as having reached high or low saturation (end of travel), are stored in two tables or by a flip-flop wiring, so as not to call upon these means during new controls of like direction, and thus to decrease the reaction time of the whole. Detection of the saturated state of a means is done by analyzing the light response brought about by control of the means. The measurement of the lighting at a given instant is compared with the measurement made at a previous instant, shifted by a duration at least equal to the reaction time TH of the means. A deviation less than the threshold HL, or than any other predetermined value, or not corresponding to the direction of activation of the means, brings about the setting of FCA or FCB, prior to passing to the next means M(K).

The software module for this variant is represented in design language in FIG. 18.

Procedures INT1, INT2, INT3 are the same as in FIG. 10 or FIG. 13. In the case where the variant is applied to the second implementation, procedure INT4 is the same as in FIG. 13.

Figure 6:
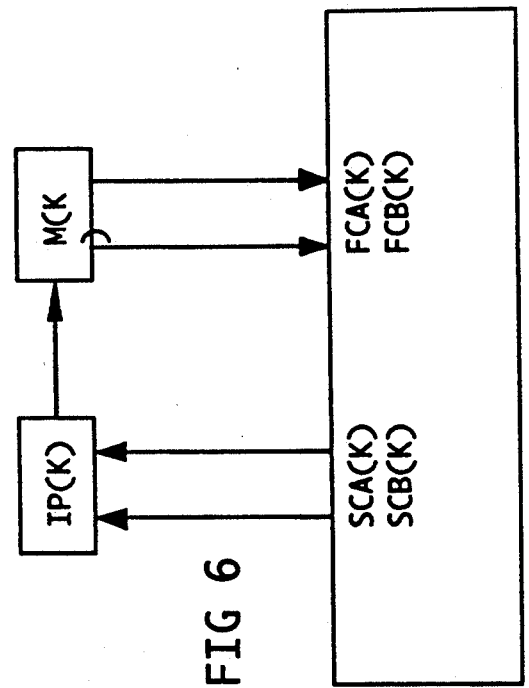
FIG. 6 represents partially the block diagram of a fourth implementation.

In a fourth implementation, the masking and lighting means M(K) each make use of two logic outputs FCA(K) and FCB(K), as represented in FIG. 6, these logic outputs indicating respectively, on the basis of sensors arranged on the means, the reaching by the means M(K) of high or low saturation (end of travel). These outputs are linked to inputs of like designation of the processor P2 or P in the case of single processor, by two-wire links.

FIG. 19 gives the software for this fourth implementation. With respect to the software of FIG. 18, this software differs in that the variables FCA(K) and FCB(K) are replaced by the states read on the outputs FCA(K) and FCB(K).

Figure 7:
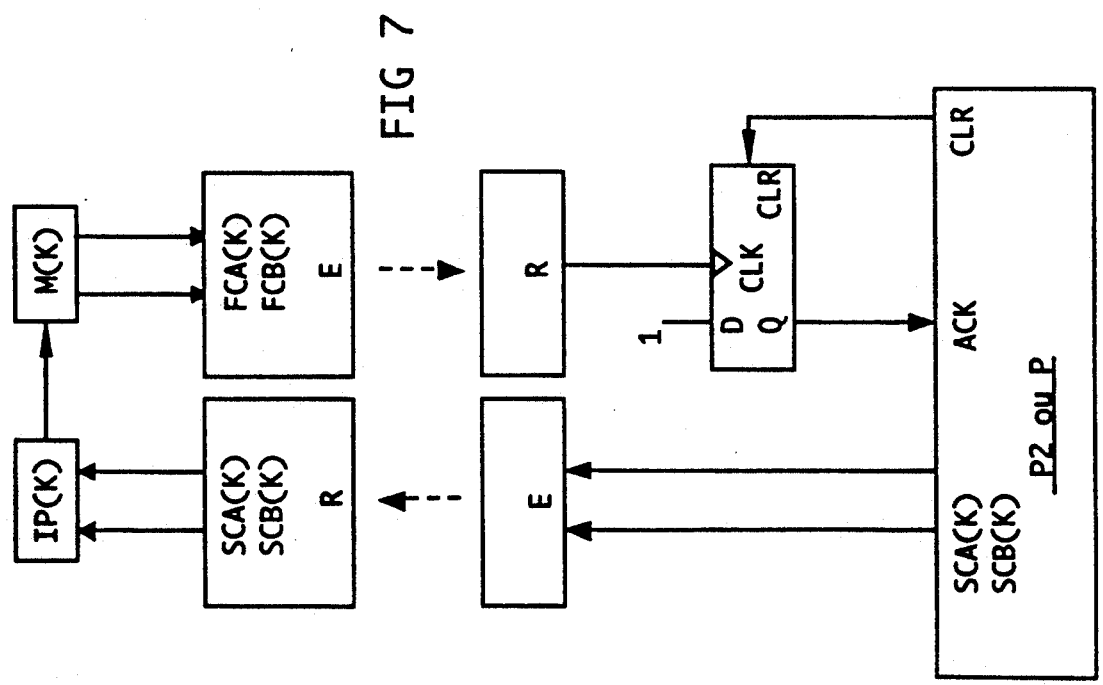
FIG. 7 represents the block diagram of a fifth implementation.
Figure 12:
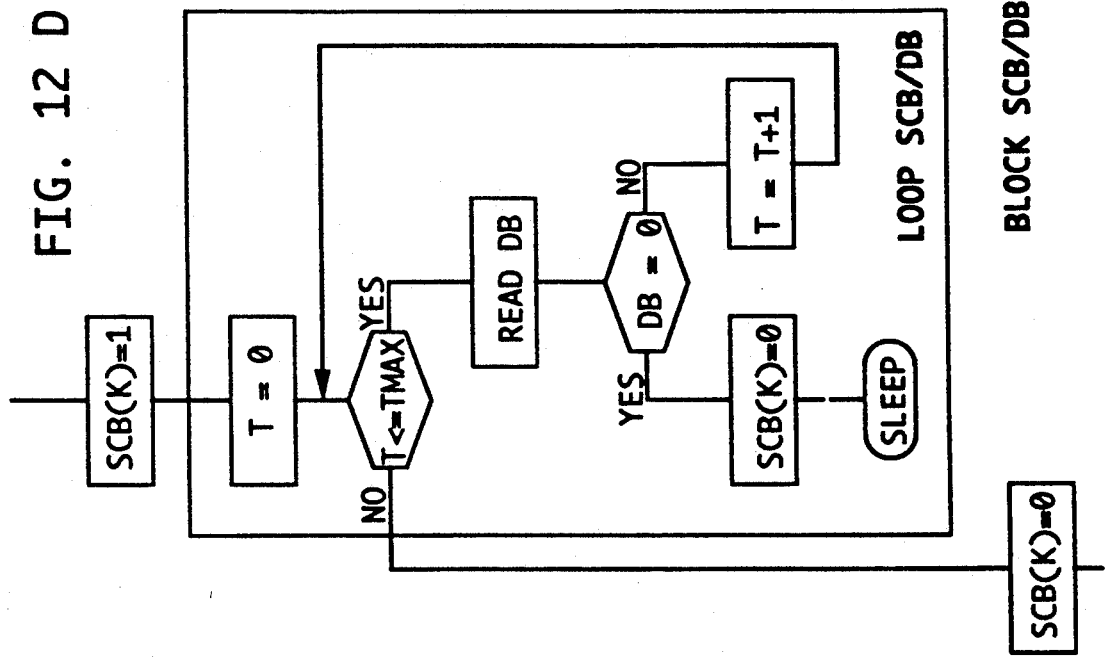
FIGS. 12a–12d represent the flow diagrams of certain subroutines of the flow diagram represented in FIG. 11.
Figure 12:
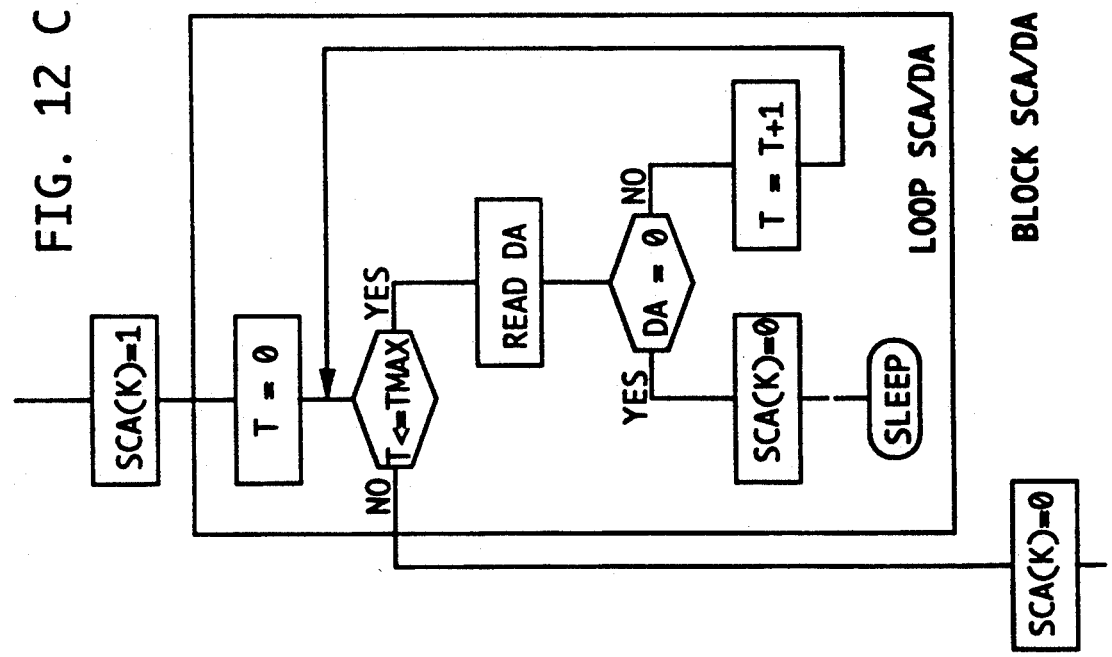

According to a fifth implementation represented in FIG. 7, the processor P2 or the single processor P is associated with a transmitter E whose signals are received by receivers R associated individually with each of the control means M(K) by way of interfaces IP(K). Each receiver has two outputs SCA(K) and SCB(K) controlling, as previously, the opening, respectively closing of the means M(K).

Each means M(K) is fitted, as previously, with sensors indicating the states of high or low saturation FCA(K) and FCB(K), and is connected to a transmitter E transmitting a single active signal, while the controlled means is active and is actually responding to a control SCA(K) or SCB(K), to a receiver R associated with the processor P2 or P by way of a flip-flop D delivering an acquisition signal ACK. The variables SCA(K) and SCB(K) are formulated by the processor P2, respectively P, by noting the absence of reception of the signal ACK after a duration TH upon application of a control SCA or SCB. The corresponding software is represented in FIG. 20. The relevant procedures are the Increase and Decrease procedures. There is moreover the complimentary "Erase" procedure by virtue of the presence of the flip-flop D.

In all the preceding implementations, it is possible to make provision for a modification by the user of the hierarchical order of the means M(K) with the aid of configuration keys set up as input to the processor P1 or P. In a programmed version, thus can be done by making an actual means index KEFF correspond to the index K and by actuating outputs SCA(KEFF) and SCB(KEFF) instead of outputs SCA(K) and SCB(K), this being accomplished, upon each assignment of a new value to K, by reading the actual index KEFF from a table.

In all the preceding implementations, it is possible to provide for additional means, for example a switch, to eliminate automatic correction of the light level.

Figure 8:
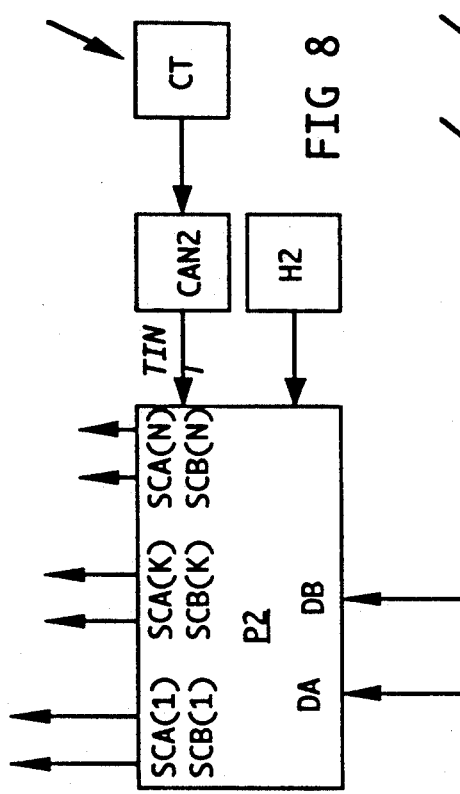
FIG. 8 represents partially the block diagram of a sixth implementation.

A sixth implementation is represented partially in FIG. 8. This implementation is derived from the first implementation represented in FIG. 3. The processor P2 is linked to a temperature-measuring probe CT measuring the inside temperature TINT applied to the processor P2 by way of an analog-digital convertor CAN2. In other respects the diagram is the same as that of FIG. 3. In this sixth implementation the masking and lighting means are distinguished by three types, M1, M2 and M3, M1 being an envelope acting simultaneously in a thermal and luminous capacity, for example an outside shutter, M2 being a masking means acting on the incoming light and of low thermal incidence, for example a venetian blind, and M3 being a means of artificial lighting with dimmer, of low thermal incidence.

With each activation of the clock H2 (or of a specific clock HST) the processor P2 compares the temperature TINT with a threshold temperature TTHRESH to formulate a position set point ALPHA of one or more means The temperature TTHRESH can be chosen or formulated according to various criteria.

According to one implementation, the temperature TTHRESH corresponds in winter to a value of several degrees greater than the set point of the heating means installed in the premises, but nevertheless remains less than or equal to the maximum of the thermal comfort range, and in summer to a value of several degrees less than the set point of the air conditioning means installed in the premises, but remaining greater than or equal to the minimum of the thermal comfort range.

According to another implementation, values of TTHRESH are prerecorded or determined by potentiometers, a summer-winter switch linked to a logic input of the processor P2 reading one or the other of the recorded or set values.

According to another implementation, the value TTHRESH is formulated from an outside temperature TEXT provided by an outside temperature probe linked to P2 through a simple algorithm of the type TTHRESH = 24° C. if TEXT < 18° C.

TTHRESH = 18° C. if TEXT > 24° C.

The position set point ALPHA of the means M2 is formulated from the comparison of TINT with TTHRESH, ALPHA taking only the following two values ALPHA = 1 (set point for full opening of M1) if TINT < TTHRESH-HT ALPHA = 0 (set point for full closure of M1) if TINT > TTHRESH+HT HT represents the temperature hysteresis.

A set point ALPHA = 1 produces a control sequence SCA(1) intended to fully satisfy this set point, whereas a set point ALPHA = 0 first of all brings about a complete opening of the means M2, thus temporarily violating the criterion for light comfort, then the order to close M1 through the control sequence SCB(1), this closure order ceasing as soon as the request for less lighting disappears. The corresponding software is given by FIG. 21.

Figure 9:
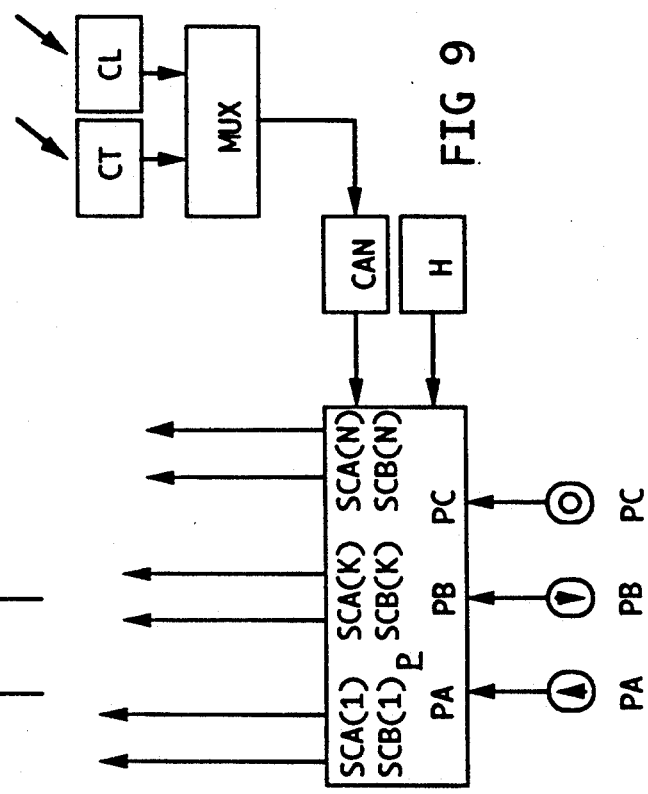
FIG. 9 represents partially the block diagram of a seventh implementation.

The configuration of a seventh implementation is represented partially in FIG. 9. The part not represented is identical to the upper part of FIG. 4. The signal from the inside temperature-measuring probe CT and the signal from the light probe CL are applied to the analog-digital convertor CAN across a multiplexing circuit MUX.

The position set point ALPHA of the means M1 is formulated as previously from the comparison of TINT with TTHRESH and can take the same values. A set point ALPHA = 1 produces a control sequence SCA(1) intended to fully satisfy this set point, whereas a set point ALPHA = 0 first of all brings about the complete opening of the means M2, thus temporarily violating the light comfort criterion, then the order to close M1 through the control SCB(1), this closure order ceasing as soon as a light level less than or equal to the set point CNL is detected. The corresponding software is given by FIG. 22.

According to a variant of the sixth and seventh implementations, there is provision, during automatic correction of the light level, for a request to increase the latter to have the effect of calling upon the means
M1, M2, M3
in the order M1, M2, M3 if ALPHA = 1 and in the order M2, M1, M3 if ALPHA=0
and a request to decrease the light level has the effect of calling upon the means
in the order M3, M2, M1 if ALPHA=1
an in the order M3, M1, M2 if ALPHA=0
so as to use the artificial lighting means only as a last resort.

In a programmed version this is done by reading successive values of K from a predefined list. FIG. 23 gives the corresponding software module in the case where the installation includes two processors P1 and P2, that is to say in the configuration represented in FIG. 8.

According to a variant implementation of the sixth implementation, the position set point ALPHA is firstly satisfied, so as to optimize economy of energy, in the case where it is less disadvantageous to use the electric lighting than to do without an optimum thermal monitoring.

During automatic corrections of light level, a request to increase the latter has the effect of calling upon the means in the order
M2, M3, M1 if ALPHA=0
and M1, M2, M3 if ALPHA=1
and a request to decrease light level has the effect of calling upon the means in the order
M1, M3, M2 if ALPHA=0
and M3, M2, M1 is ALPHA=1.

The corresponding software is represented in FIG. 24.

According to another variant of the sixth implementation, in a configuration according to FIG. 8, the position set point ALPHA is analog. For this purpose, means M1 is equipped with a position sensor giving the measured value M_ALPHA of the opening of the means M1, directly accessible by the processor P2 (hard-wired logic) or with the aid of an analog-digital convertor (programmed version). The analog set point value ALPHA is calculated from the deviation between TINT and TTHRESH according to a conventional law of automatic correction, for example proportional, or using the processing of fuzzy sets, or of symbolic variables.

Account is taken of a hysteresis threshold HA intended to preclude calling upon the means M1 too frequently.

A set point ALPHA greater than M_ALPHA+HA produces a control sequence SCA(1) intended to fully satisfy the point, whereas a set point ALPHA less than M_ALPHA−HA first of all brings about the complete opening of the means M2 thus temporarily violating the light comfort criterion, then the order to close M1 through the control SCB(1). During this positioning the control to lower the means M1 is interrupted as soon as the request for less lighting DB disappears. The corresponding software is given by FIG. 25.

In a configuration with a single processor P the order to close M1 by SCB(1) ceases as soon as a light level less than or equal to the set point CNL is detected.

According to a variant implementation of the preceding implementation, with one or two processors, a request to increase the light level, during automatic corrections, has the effect of calling upon the means in the order M1, M2, M3 if ALPHA greater than M_ALPHA, and in the order M2, M1, M3 if ALPHA less than M_ALPHA, whereas a request to decrease the light level has the effect of calling upon the means in the order M3, M2, M1 if ALPHA greater than M_ALPHA and in the order M3, M1, M2 if ALPHA less than M_ALPHA, so as to use the artificial lighting only as a last resort.

According to another variant of the preceding implementation, the means M1 is again equipped with a position sensor by means of which an analog position set point ALPHA calculated from the deviation between TINT and TTHRESH is obtained. The set point is firstly satisfied so as to optimize the economy of energy, in the case where it is less disadvantageous to use the electric lighting than to do without an optimum thermal monitoring. During automatic corrections of light level, a request to increase the latter has the effect of calling upon the means in the order:
M2, M3, M1 if ALPHA<M_ALPHA
and M1, M2, M3 if ALPHA>M_ALPHA A request to decrease the light level has the effect of calling upon the means in the order:
M1, M3, M2 if ALPHA<M_ALPHA
and M3, M2, M1 if ALPHA>M_ALPHA According to an eighth implementation, the means M1 is an internal masking means equipped with orientable blades, represented diagrammatically in FIG. 26, the blades LO exhibiting different thermal and luminous behavior on the two faces, one of the faces LOR being partially or fully reflective and the other face LO partially or fully absorbent. There is provision for three pilot indicators of saturation FCA(1), FCB(1) and FCBO(1), which are formulated for example in analog fashion, by analyzing the variations in lighting as in FIG. 18 or mechanically, with respective meanings of maximum opening of the blades, and closure of the blades, absorbent side facing the glazed bay B, closure of the blades, reflective side facing the glazed bay B.

Application of a control SCA(1)=1 makes it possible, from an initial state FCBO(1)=1, to pass successively from FCBO to FCA then to FCB1, whereas the application of a control SCB(1)=1 makes it possible, from an initial state FCB1(1)=1, to pass successively from FCB1 to FCA, then to FCB0.

There is provision for a position detector, embodied in physical or logical fashion, which is set when the blades pass either side of the position of maximum opening FCA and which simply delivers two values 1 or 0 namely:
M_ALPHA=1 if the blades lie between FCA and FCB1
M_ALPHA=0 if the blades lie between FCA and FCBO.

The processor can thus know whether the reflective face or the absorbent face of the blades is facing at the glazed bay.

The installation differentiates between two types of means M1 and M2, M2 being a means of artificial lighting with dimmer, of low thermal incidence.

The processor P2 is linked to a second inside temperature-measuring probe CT as in FIG. 8 and with each activation of the clock H2, it compares the temperature TINT with a threshold temperature TTHRESH to formulate a position set point ALPHA of the means M1. The temperature TTHRESH is formulated according to one of the previously described implementations.

A position set point ALPHA of M1 is formulated by comparison of the TINTs with TTHRESH, this set point being able to take the logical values or 0, the value 1 corresponding to a set point of interval of positions of the blades absorbent faces facing the glazed bay, that is to say in a position between FCA and FCB1, if TIN- T<TTHRESH−HT, the value 0 corresponding to an interval of positions of the blades reflective faces facing the glazed bay, that is to say in a position between FCA and FCBO, if TINT<TTHRESH+HT.

A thermal monitoring sequence determines the value of ALPHA, then positions the blades until M_ALPHA=ALPHA if there is disagreement between these two values. The automatic corrections, like the manual controls, of light level actuate SCA(1) to bring about a decrease in lighting and SCB(1) to bring about an increase in lighting, when M_ALPHA=1 whereas they actuate SCB(1) to bring about a decrease in lighting and SCA(1) to bring about an increase in lighting when M_ALPHA=0.

The corresponding software is given by FIG. 27. So as to save space, the procedures INT1, INT2, INT3 have not been indicated. These procedures can be the same as those of FIG. 10 or 13 or 14 or 15 or 16. ML represents the lighting value CL measured at the current instant.

Other variant implementations are possible. In particular, the galvanic link between the probes CL and CT, on the one hand, and the processors P, P1 and P2 can be replaced by links of any sort.

In a simplified variant of the sixth, seventh and eighth implementations, the set point ALPHA is formulated simply by copying the state of a switch, thereby obviating recourse to the temperature sensor CT and to the convertor CAN 2 or multiplexer MUX.

I claim:

1. An installation for controlling the lighting level of premises provided with at least one opening permitting entry of natural light and fitted with means of masking the said opening and with means of artificial lighting (M(1) to M(N)), means associated with control operators (IP(1) to IP(N)), this installation comprising photosensitive means (CL) for measuring the lighting level, means (P1, P2; P) of automatic control of the operators monitored by photosensitive means as a function of a lighting set point, means of adjusting the set point consisting of manually actuatable contacts (PA, PB, PC) and means (PI, P2; P) of storing this set point, and in which the means of automatic control comprise a logic processing unit (P, CAN, H; P1, CAN1, H1, P2, H2) electrically connected, by galvanic link or otherwise, to the photosensitive means (CL), to the manually actuatable contacts and to the operators, the logic processing unit being programmed to read the state of the contacts and the values measured by the photosensitive means and to emit signals for more or less lighting directed towards the operators, on the one hand as a function of the state of the said contacts (PA, PB) and on the other hand as a function of the deviation between the set point value and the value measured by the photosensitive means, and to record, at an instant determined by the user, a lighting value measured by the photosensitive means, wherein it comprises means (P1, P2; P) of effecting successive control, in a predefined order, of the masking means and of the lighting means, these control means being arranged in such a way that they pass from one means (M(K)) to the next means (M(K±1)) after a specified duration.

2. The installation as claimed in claim 1, wherein the said means for effecting successive control consist of a second logic processing unit (P2) receiving orders from a first logic processing unit (P1).

3. The installation as claimed in claim 2, wherein said specified duration (TMAX) for passing from one means to the next means is identical for each means and equal to the duration required for the slowest means to pass from a completely open state to a completely closed state.

4. The installation as claimed in claim 2, wherein the specified duration (TMAX)(K)) for passing from one means to the next means is specific to each means, a table of N constants being provided for this purpose in the memory of the logic processing unit.

5. The installation as claimed in claim 2, wherein the specified duration (TH) for passing from one means to the next means is equal to the time required for the slowest means to bring about a significant variation in the lighting.

6. The installation as claimed in claim 2, wherein the specified duration (TH)(K)) for passing from one means to the next means is specific to each means, a table of N constants being provided for this purpose in the memory of the logic processing unit.

7. The installation as claimed in claim 1, wherein said means for effecting successive control are provided in a single logic processing unit (P) connected to the manually actuatable contacts (PA, PB, PC) and to the photosensitive means (CL).

8. The installation as claimed in claim 7, wherein said specified duration (TMAX) for passing from one means to the next means is identical for each means and equal to the duration required for the slowest means to pass from a completely open state to a completely closed state.

9. The installation as claimed in claim 7, wherein the specified duration (TMAX)(K)) for passing from one means to the next means is specific to each means, a table of N constants being provided for this purpose in the memory of the logic processing unit.

10. The installation as claimed in claim 7, wherein the specified duration (TH) for passing from one means to the next means is equal to the time required for the slowest means to bring about a significant variation in the lighting.

11. The installation as claimed in claim 7, wherein the specified duration (TH)(K)) for passing from one means to the next means is specific to each means, a table of N constants being provided for this purpose in the memory of the logic processing unit.

12. The installation as claimed in claim 1, wherein it comprises a manually actuatable contact (PK) making it possible to pass at will from the control of one means (M) to the control of all the succeeding means, display means (L(K)) being provided for displaying that means controlled.

13. The installation as claimed in claim 12, wherein the logic processing unit is programmed or hard-wired in such a way that, during automatic control, it is unaware of that means (M(K)) corresponding to the latest manual control applied.

14. The installation as claimed in claim 12, wherein the logic processing unit is programmed or hard-wired in such a way that, during automatic control, it acts by priority on that means (M(K)) corresponding to the latest manual control applied.

15. The installation as claimed in claim 1, wherein it comprises means of detecting and storing the saturation states (FCA, FCB) of the means of masking and of lighting (M), the logic processing unit being programmed in such a way as not to call upon those means (M(K)) in a state of saturation during new controls of like direction.

16. The installation as claimed in claim 15, wherein said means of detection consist of means of comparison which compare the measurement of the lighting at a given instant with the measurement made at a preceding instant shifted by a duration at least equal to the reaction time (TH) of the means (M(K)) and delivering a saturation signal when the deviation between the compared values is less than a specified value or does not correspond to the direction of activation of the means (M(K)).

17. The installation as claimed in claim 15, wherein said means of detection comprise sensors arranged on the means (M) and connected to the logic processing unit by any means, galvanic or otherwise, these sensors transmitting solely a saturation signal (FCA, FCB).

18. The installation as claimed in claim 15, wherein said means of detection comprise sensors arranged on the means (M) and connected to the logic processing unit by any means, galvanic or otherwise, these sensors transmitting a continuous acquisition signal (ACK) while the controlled means is active and is responding to a control, the logical saturation variables (FCA, FCB) being formulated by noting the absence of reception of the acquisition signal (ACK) after a duration at least equal to the reaction time (TH) of the means.

19. The installation as claimed in claim 1, wherein it comprises configuration keys (CF) enabling the user to modify the hierarchical order of control of the means (M).

20. The installation as claimed in claim 1, wherein it comprises at least two kinds of masking means (M1, M2) having different thermal incidences, possibly a means of artificial lighting with dimmer (M3), a temperature-measuring probe (CT) for measuring the inside temperature (TINT) and means of comparing this inside temperature (TINT) with a threshold temperature (TTHRESH), the means of automatic control being programmed to formulate a position set point (ALPHA) of the masking means with large thermal incidence (M1) as a function of the deviation measured by said means of comparison.

21. The installation as claimed in claim 1, wherein it comprises at least two kinds of masking means (M1, M2) having different thermal incidences, possibly a means of artificial lighting with dimmer (M3), two-position switch making it possible directly to assign the values 1 or 0 to a position set point (ALPHA) of the masking means with large thermal incidence (M1).

22. The installation as claimed in claim 20, comprising two processors (P1, P2), wherein the processors are programmed in such a way that said position set point (ALPHA) takes only the two values 1 or 0 corresponding to full opening and full closing respectively, and wherein a set point equal to 1 produces a control sequence (SCA(1)) intended to satisfy it fully, whereas a set point equal to 0 first of all brings about full opening of the masking means with low thermal incidence (M2), and then the order to close (SCB(1)) the masking means with high thermal incidence (M1), which order ceases as soon as the request for less light (DB) disappears.

23. The installation as claimed in claim 20, comprising a single processor (P), wherein the processors are programmed in such a way that said position set point (ALPHA) takes only the two values 1 or 0 corresponding to full opening and full closing respectively, and wherein a set point equal to 1 produces a control sequence (SCA(1)) intended to satisfy it fully, whereas a set point equal to 0 first of all brings about full opening of the masking means with low thermal incidence (M2), and then the order to close (SCB(1)) the masking means with high thermal incidence (M1), which order ceases as soon as a light level less than or equal to the set point (CNL) is detected.

24. The installation as claimed in claim 21, comprising two processors (P1, P2), wherein the processors are programmed in such a way that said position set point (ALPHA) takes only the two values 1 or 0 corresponding to full opening and full closing respectively, and wherein a set point equal to 1 produces a control sequence (SCA(1)) intended to satisfy it fully, whereas a set point equal to 0 first of all brings about full opening of the masking means with low thermal incidence (M2), and then the order to close (SCB(1)) the masking means with high thermal incidence (M1), which order ceases as soon as the request for less light (DB) disappears.

25. The installation as claimed in claim 21, comprising a single processor (P), wherein the processors are programmed in such a way that said position set point (ALPHA) takes only the two values 1 or 0 corresponding to full opening and full closing respectively, and wherein a set point equal to 1 produces a control sequence (SCA(1)) intended to satisfy it fully, whereas a set point equal to 0 first of all brings about full opening of the masking means with low thermal incidence (M2), and then the order to close (SCB(1)) the masking means with high thermal incidence (M1), which order ceases as soon as a light level less than or equal to the set point (CNL) is detected.

26. The installation as claimed in claim 22, wherein a request to increase the light level has the effect of calling upon firstly the masking means with high thermal incidence (M1), then the masking means with low thermal incidence (M2) and finally the lighting means (M3), if the position set point (ALPHA) is equal to 1 and of calling upon firstly the masking means with low thermal incidence (M2), then the masking means with high thermal incidence (M1) and finally the lighting means (M3), if the position set point is equal to 0 and wherein a request to decrease the light level has the effect of calling upon firstly the lighting means (M3), then the masking means with low thermal incidence (M2) and finally the masking means with high thermal incidence (M1), if the set point is equal to and of calling upon firstly the lighting means (M3), then the masking means with high thermal incidence (M1) and finally the masking means with low thermal incidence (M2), if the set point is equal to 0.

27. The installation as claimed in claim 22, wherein this position set point is firstly satisfied during thermal monitoring and wherein a request to increase the light level has the effect of calling upon firstly masking means with low thermal incidence (M2), then the lighting means (M3) and finally the masking means with high thermal incidence (M1), if the position set point is equal to 0 and of calling upon firstly the masking means with high thermal incidence (M1) then the means with low thermal incidence (M2) and finally the lighting means (M3), if the position set point is equal to 1, and wherein a request to decrease the light level has the effect of calling upon firstly the masking means with high thermal incidence (M1) then the lighting means (M3) and finally the means with low thermal incidence (M2), if the position set point is equal to 0 and of calling upon firstly the lighting means (M3), then the masking means with low thermal incidence (M2) and finally the masking means with high thermal incidence (M1), if the position set point is equal to 1.

28. The installation as claimed in claim 23, wherein a request to increase the light level has the effect of calling upon firstly the masking means with high thermal incidence (M1), then the masking means with low thermal incidence (M2) and finally the lighting means (M3), if the position set point (ALPHA) is equal to 1 and of calling upon firstly the masking means with low thermal incidence (M2), then the masking means with high thermal incidence (M1) and finally the lighting means (M3), if the position set point is equal to 0 and wherein a request to decrease the light level has the effect of calling upon firstly the lighting means (M3), then the masking means with low thermal incidence (M2) and finally the masking means with high thermal incidence (M1), if the set point is equal to 1 and of calling upon firstly the lighting means (M3), then the masking means with high thermal incidence (M1) and finally the masking means with low thermal incidence (M2), if the set point is equal to 0.

29. The installation as claimed in claim 23, wherein this position set point is firstly satisfied during thermal monitoring and wherein a request to increase the light level has the effect of calling upon firstly masking means with low thermal incidence (M2), then the lighting means (M3) and finally the masking means with high thermal incidence (M1), if the position set point is equal to 0 and of calling upon firstly the masking means with high thermal incidence (M1) then the means with low thermal incidence (M2) and finally the lighting means (M3), if the position set point is equal to 1, and wherein a request to decrease the light level has the effect of calling upon firstly the masking means with high thermal incidence (M1) then the lighting means (M3) and finally the means with low thermal incidence (M2), if the position set point is equal to 0 and of calling upon firstly the lighting means (M3), then the masking means with low thermal incidence (M2) and finally the masking means with high thermal incidence (M1), if the position set point is equal to 1.

30. The installation as claimed in claim 20, comprising two processors (P1, P2), wherein the masking means with high thermal incidence (M1) is equipped with a position sensor delivering an analog value (M_ALPHA) of the degree of opening of this means, means being provided to calculate the analog value of the position set point (ALPHA) according to a law of automatic correction, and the processors being programmed in such a way that a position set point (ALPHA) greater than the measured analog value increased by a hysteresis value produces a control sequence (SCA(1)) intended to fully satisfy the set point, whereas a position set point less than the measured analog value decreased by a hysteresis value first of all brings about the complete opening of the masking means with low thermal incidence (M2) and control of the closing of the masking means with high thermal incidence (M1) is interrupted during this positioning, as soon as the request (DB) for less light disappears.

31. The installation as claimed in claim 20, comprising a single processor (P), wherein the masking means with high thermal incidence (M1) is equipped with a position sensor delivering an analog value (M_ALPHA) of the opening of this means, means being provided to calculate the analog value of the position set point (ALPHA) according to a law of automatic correction, and the processor being programmed in such a way that a position set point greater than the analog value, increased by a hysteresis value, produces a control sequence (SCA(1)) intended to satisfy it fully, whereas a position set point less than the measured value, decreased by a hysteresis value, first of all brings about the complete opening of the masking means with low thermal incidence (M2), then the order to close the masking means with high thermal incidence, which order ceases as soon as a light level less than or equal to the light level set point (CNL) is detected.

32. The installation as claimed in claim 20, comprising two processors (P1, P2), wherein the masking means with high thermal incidence (M1) is equipped with a position sensor delivering an analog value (M_ALPHA) of the degree of opening of this means (M1), means being provided to calculate the analog value of the position set point (ALPHA) according to a law of automatic correction, and the processors being programmed in such a way that during automatic corrections of light level, a request to increase the light level has the effect of calling upon firstly the masking means with high thermal incidence (M1), then the masking means with low thermal incidence (M2) and finally the lighting means (M3) if the position set point is greater than the measured analog value (M_ALPHA) and of calling upon firstly the masking means with low thermal incidence (M2) then the means with high thermal incidence (M1) and finally the lighting means (M3), if the position set point is less than the measured analog value, and wherein a request to decrease the light level has the effect of calling upon firstly the lighting means (M3), then the masking means with low thermal incidence (M2) and finally the masking means with high thermal incidence (M1) if the position set point is greater than the measured analog value, and of calling upon firstly the lighting means (M3), then the masking means with high thermal incidence (M1) and finally the masking means with low thermal incidence (M2), if the position set point is less than the measured analog value.

33. The installation as claimed in claim 20, comprising two processors (P1, P2), wherein the masking means with high thermal incidence (M1) is equipped with a position sensor delivering an analog value (M_ALPHA) of the degree of opening of this means, means being provided to calculate the analog value of the position set point (ALPHA) according to a law of automatic correction and the processors being programmed in such a way that the position set point is firstly satisfied and that, during automatic corrections of the light level, a request to increase the light level has the effect of calling upon firstly the masking means with low thermal incidence (M2) then the lighting means (M3) and finally the masking means with high thermal incidence (M1), if the position set point is less than the measured analog value (M_ALPHA), and of calling upon firstly the masking means with high thermal incidence (M1), then the means with low thermal incidence (M2) and finally the lighting means (M3), if the position set point is greater than the measured analog value, and wherein a request to decrease the light level has the effect of calling upon firstly the masking means with high thermal incidence (M1), then the lighting means (M3) and finally the masking means with low thermal incidence (M2), if the position set point is less than the measured analog value and of calling upon firstly the lighting means (M3), then the masking means with low thermal incidence (M2) and finally the masking means with high thermal incidence (M1), if the position set point is less than the measured analog value, and of calling upon firstly the lighting means (M3), then the masking means with low thermal incidence (M2) and finally the masking means with high thermal incidence (M1), if the position set point is greater than the measured analog value.

34. The installation as claimed in claim 21, comprising two processors (P1, P2), wherein the masking means with high thermal incidence (M1) is equipped with a position sensor delivering an analog value (M_ALPHA) of the degree of opening of this means, means being provided to calculate the analog value of the position set point (ALPHA) according to a law of automatic correction, and the processors being programmed in such a way that a position set point (ALPHA) greater than the measured analog value increased by a hysteresis value produces a control sequence (SCA(1)) intended to fully satisfy the set point, whereas a position set point less than the measured analog value decreased by a hysteresis value first of all brings about the complete opening of the masking means with low thermal incidence (M2) and control of the closing of the masking means with high thermal incidence (M1) is interrupted during this positioning, as soon as the request (DB) for less light disappears.

35. The installation as claimed in claim 21, comprising a single processor (P), wherein the masking means with high thermal incidence (M1) is equipped with a position sensor delivering an analog value (M_ALPHA) of the opening of this means, means being provided to calculate the analog value of the position set point (ALPHA) according to a law of automatic correction, and the processor being programmed in such a way that a position set point greater than the analog value, increased by a hysteresis value, produces a control sequence (SCA(1)) intended to satisfy it fully, whereas a position set point less than the measured value, decreased by a hysteresis value, first of all brings about the complete opening of the masking means with low thermal incidence (M2), then the order to close the masking means with high thermal incidence, which order ceases as soon as a light level less than or equal to the light level set point (CNL) is detected.

36. The installation as claimed in claim 21, comprising two processors (P1, P2), wherein the masking means with high thermal incidence (M1) is equipped with a position sensor delivering an analog value (M_ALPHA) of the degree of opening of this means (M1), means being provided to calculate the analog value of the position set point (ALPHA) according to a law of automatic correction, and the processors being programmed in such a way that during automatic corrections of light level, a request to increase the light level has the effect of calling upon firstly the masking means with high thermal incidence (M1), then the masking means with low thermal incidence (M2) and finally the lighting means (M3) if the position set point is greater than the measured analog value (M_ALPHA) and of calling upon firstly the masking means with low thermal incidence (M2) then the means with high thermal incidence (M1) and finally the lighting means (M3), if the position set point is less than the measured analog value, and wherein a request to decrease the light level has the effect of calling upon firstly the lighting means (M3), then the masking means with low thermal incidence (M2) and finally the masking means with high thermal incidence (M1) if the position set point is greater than the measured analog value, and of calling upon firstly the lighting means (M3), then the masking means with high thermal incidence (M1) and finally the masking means with low thermal incidence (M2), if the position set point is less than the measured analog value.

37. The installation as claimed in claim 21, comprising two processors (P1, P2), wherein the masking means with high thermal incidence (M1) is equipped with a position sensor delivering an analog value (M_ALPHA) of the degree of opening of this means, means being provided to calculate the analog value of the position set point (ALPHA) according to a law of automatic correction and the processors being programmed in such a way that the position set point is firstly satisfied and that, during automatic corrections of the light level, a request to increase the light level has the effect of calling upon firstly the masking means with low thermal incidence (M2) then the lighting means (M3) and finally the masking means with high thermal incidence (M1), if the position set point is less than the measured analog value (M_ALPHA), and of calling upon firstly the masking means with high thermal incidence (M1), then the means with low thermal incidence (M2) and finally the lighting means (M3), if the position set point is greater than the measured analog value, and wherein a request to decrease the light level has the effect of calling upon firstly the masking means with high thermal incidence (M1), then the lighting means (M3) and finally the masking means with low thermal incidence (M2), if the position set point is less than the measured analog value and of calling upon firstly the lighting means (M3), then the masking means with low thermal incidence (M2) and finally the masking means with high thermal incidence (M1), if the position set point is less than the measured analog value, and of calling upon firstly the lighting means (M3), then the masking means with low thermal incidence (M2) and finally the masking means with high thermal incidence (M1), if the position set point is greater than the measured analog value.

38. The installation as claimed in claim 1, in which the masking means are internal masking means of the type with orientable blades (LO) of which one (LOA) of the faces is essentially absorbent and the other face (LOR) essentially reflective of light, wherein it comprises means of detecting and storing three position saturation states of the blades, namely a state of maximum opening (FCA(1)), a state of closure in which the absorbent face is turned outwards (FCB1(1)) and a state of closure in which the reflective face is on the outwards side (FCB0(1)), the logic processing unit being programmed in such a way that a movement control in a first direction (SCA(1)) makes it possible, from an initial state in which the reflective faces of the blades are turned outwards, to pass successively to the state of maximum opening, then to the state in which the absorbent faces are turned outwards, whereas a movement control in a second direction (SCB (1)) makes it possible, from an initial state in which the absorbent faces are turned outwards, to pass successively to the state of maximum opening, then to the state in which the reflective faces are turned outwards, means being provided to detect and record the passage of the blades either side of the position of maximum opening, the recorded value (M_ALPHA) being 1 or 0 according as the blade passes from one side or the other of the position of maximum opening, and either a two-position switch making it possible directly to assign a value 1 or 0 to a position set point (ALPHA) of the masking means corresponding respectively to the interval of positions in which the absorbent faces are turned outwards and to the interval with positions in which the reflective faces are turned outwards;

or a temperature-measuring problem (CT) measuring the inside temperature (TINT), the logic processing unit being programmed in such a way that the inside temperature (TINT) is periodically compared with a threshold temperature (TTHRESH) in order to formulate a position set point (ALPHA) of the masking means such that the former takes the value 1 or 0 corresponding respectively to the position interval in which the absorbent faces are turned outwards and to the position interval in which the reflective faces are turned outwards, if the inside temperature is less than the threshold temperature, respectively greater than the threshold temperature and, to position, in one or other of the preceding cases, the blades in such a way that the detected value is equal to the position set point value, and to activate one or other of the outputs (SCA, SCB) during automatic or manual corrections of the lighting level, according as the position value (M_ALPHA) is 1 or 0.

* * * * *